Feb. 24, 1959　　　　T. P. FAULCONER　　　　2,874,478
COMBINATION CALIPER AND SLIDE RULE
Filed Nov. 22, 1955
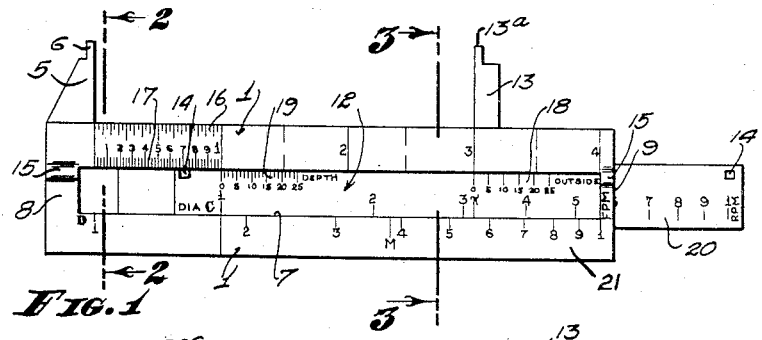
INVENTOR.
THOMAS P. FAULCONER
BY
ATTORNEYS – # United States Patent Office 2,874,478
Patented Feb. 24, 1959

2,874,478

COMBINATION CALIPER AND SLIDE RULE

Thomas P. Faulconer, Rancho Santa Fe, Calif.

Application November 22, 1955, Serial No. 548,431

5 Claims. (Cl. 33—143)

This invention relates to a combination caliper and slide rule, and included in the objects of this invention are:

First, to provide a device of this type wherein a caliper measurement of a diameter may be made which results automatically in a setting, whereby the circumference as well as the area corresponding to the diameter measurement may be read directly.

Second to provide a combination caliper and slide rule wherein a caliper measurement may be readily and quickly transferred to a slide rule setting for the purpose of slide rule calculators involving the initial caliper measurement.

Third, to provide a combination caliper and slide rule which is particularly adapted to determine the relation between revolutions-per-minute of a rotating member and the surface speed of such member in feet-per-minute.

With the above and other objects in view, as may appear hereinafter, reference is directed to the accompanying drawings in which:

Figure 1 is a front side elevational view of the combination caliper and slide rule shown in a partially extended position;

Fig. 2 is a transverse sectional view through 2—2 of Fig. 1;

Fig. 3 is a transverse sectional view through 3—3 of Fig. 1;

Fig. 4 is a partial sectional, partial elevational view, showing the rear side of the combination caliper and slide rule; and Fig. 5 is a fragmentary view of the rear side of the combination caliper and slide rule.

The combination caliper and slide rule includes a front plate 1 and a back plate 2. Interposed between the front plate and back plate, along one longitudinal margin, is a spacer bar 3. The front and back plates are also separated by a spacer member 4 located at one corner opposite the spacer bar and by a fixed caliper mandible 5 located at the remaining corner. The fixed caliper mandible extends laterally from the front and back plates and terminates in a caliper tip 6.

The front plate 1 is provided with a longitudinally extending slot 7 terminating adjacent the ends of the front plate to form end webs 8 and 9 which join the two side margins of the front plate.

The back plate 2 is provided near each end with rectangular windows 10 and 11.

A slide member 12 is slidably mounted between the front and back plates 1 and 2. The slide member is guided by the spacer bar 3. The slide member is also guided by the edge of the spacer member 4 and the fixed caliper member 5 confronting the spacer bar 3. Between the spacer member 4 and fixed caliper mandible 5 the back and front plates 1 and 2 define a longitudinal slit.

The slide member 12 is provided with a laterally extending caliper mandible 13. The movable caliper mandible 13 rides in the slit between the fixed caliper mandible 5 and the spacer member 4. In order to prevent tilting movement of the slide member 12 when occupying an intermediate position guided only by the spacer member 4 or fixed caliper mandible 5, guide bosses 14 are provided adjacent the ends of the slide member. These guide bosses ride along the margin of the slot 7 remote from the spacer bar 3.

The end webs 8 and 9 are provided with clearance channels 15 to permit passage of the bosses 14.

The front side of the combination caliper and slide rule, as viewed in Fig. 1, is provided at its upper margin with a caliper scale 16 graduated in sixty-fourths and a second caliper scale 17 graduated in hundredths.

The slide member 12 may be provided with a vernier scale 18 for cooperation with the caliper scale 17. In order to measure the depth of a recess or the like, the slide member 12 is capable of movement to the right, as viewed in Fig. 1, and is provided with a vernier depth scale 19 at its left end, which also cooperates with the caliper scale 17, and is so arranged that the distance between the extremity of the slide member 12 and the adjacent end of the front and back plates may be measured.

The lower margin of the slide member 12, as viewed in Fig. 1, is provided with a conventional slide rule "C" scale 20, which is a logarithmic scale, and the corresponding margin of the front plate bordering the slot 7 is provided with a companion "D" scale 21. These scales are utilized in the conventional manner for slide rule calculations.

The back side of the slide member 12 is provided along its upper margin, as viewed in Fig. 4, with a conventional "B" scale 22. The windows 10 and 11 are provided with reference lines 23 and 24 for use in conjunction with the "B" scale to indicate squares and square roots. The "B" scale is employed in the conventional manner in cooperation with the "C" scale and "D" scale 21.

The margin of the back plate 2, from which extend the caliper mandibles 5 and 13, is provided with a circumference scale 25.

The slide member 12 is provided on its back side, opposite the "B" scale 22, with an area scale 26 which cooperates with a pair of reference lines 27 and 28 provided at a margin of the window 11.

The gradations of the various scales are only partially indicated, to facilitate the illustration.

Operation of the combined caliper and slide rule is as follows:

For simple caliper measurements, the confronting edges of the fixed and movable caliper mandibles 5 and 13 are employed, and the dimension is read directly on the caliper scales 16 and 17 or by the combined use of the scale 17 and the vernier scale 18. The tip 6 of the fixed caliper mandible 5 and the tip 13a of the movable caliper mandible 13 may have a known width so that for purposes of inside measurement a corresponding constant may be added to the reading of the scales 16 and 17.

When the instrument is employed as a caliper, not only may the diameter of a workpiece be determined but by use of the circumference scale 25 and the area scale 26, all without resetting the caliper, the circumference and the area of the workpiece corresponding to the diameter measurement may be readily and quickly ascertained. This is illustrated in Fig. 5, wherein a diameter of 1" is indicated, a circumference of 3.1416 or pi, or an area of .785.

A measurement made by the caliper mandibles 5 and 13 may be translated to read on the "C" or "D" scale for the purpose of slide rule calculation. This is true also of a depth measurement obtained from the scale 17 and the depth vernier 19.

It is particularly convenient to determine the surface speed of a workpiece of given diameter. This is desirable in order to find the lathe speed and cutting speed for turning material, and is accomplished as follows:

The diameter determined by the caliper measurement is read on the "C" scale 20 and set opposite the value 3.81 of the "D" scale 21 which is marked "M" on the "D" scale. One then selects the desired feet-per-minute reading on the "D" scale 21 and reads the corresponding value on the "C" scale 20. Numerous other caliper measurements and slide rule calculations may, of course, be made.

While a particular embodiment of this invention has been shown and described, it is not intended to limit the same to the exact details of the construction set forth, and it embraces such changes, modifications, and equivalents of the parts and their formation and an arrangement as come within the purview of the appended claims.

I claim:

1. A combination caliper and slide rule, comprising: a frame having a front slot and a slideway extending longitudinally therethrough, an edge slit communicating with said slideway; a fixed caliper mandible at one end of said edge slit; a slide member slidable in said slideway, viewable through said slot, and having a laterally extending movable caliper mandible intermediate its ends projecting through said slit into confronting relation with said fixed caliper mandible, said slide member being of substantially the same length as said frame.

2. A device as defined in claim 1 including a guide boss fixed on said slide member adjacent an end thereof and slidably bearing against the edge of said slot nearest said edge slit.

3. A device as defined in claim 1 wherein said frame comprises spaced apart front and back elongated plates, said slot being in said front plate, said slit being defined by the space between adjacent longitudinal edges of said plates, said slide member being of greater width than said slot and having guide bosses thereon slidably engaging an edge of said slot.

4. A combination caliper and slide rule, comprising: a frame having a front slot and a slideway extending longitudinally therethrough, an edge slit communicating with said slideway; a fixed caliper mandible at one end of said edge slit; a slide member slidable in said slideway, viewable through said slot, and having a laterally extending movable caliper mandible intermediate its ends projecting through said slit into confronting relation with said fixed caliper mandible; and cooperating logarithmic scales on said slide and frame, said movable mandible being spaced from said fixed mandible and intermediate the ends of said edge slit when the ends of said logarithmic scales coincide.

5. A device as defined in claim 4 wherein the ends of said slide member are substantially flush with the ends of said frame and said movable mandible is substantially midway between the ends of said slit when the ends of said logarithmic scales coincide.

References Cited in the file of this patent

UNITED STATES PATENTS

| | | |
|---|---|---|
| 613,684 | Kienast | Nov. 8, 1898 |
| 1,329,911 | Lenti | Feb. 3, 1920 |
| 1,568,475 | Schwanda | Jan. 5, 1926 |
| 2,256,030 | Lipani | Sept. 16, 1941 |

FOREIGN PATENTS

| | | |
|---|---|---|
| 10,884 | Great Britain | 1898 |
| 156,787 | Switzerland | Nov. 1, 1932 |

OTHER REFERENCES

Pages 137, 529 and 530, of the "Sheet Metal Worker's Manual," by L. Broemel, published by Frederick G. Drake & Co., in Chicago, in 1918. The Scientific Lib. Catalog index is T. S. 250 85.